United States Patent
Li et al.

(10) Patent No.: US 10,361,437 B2
(45) Date of Patent: Jul. 23, 2019

(54) GOLD NANOPARTICLES-ENHANCED PROTON EXCHANGE MEMBRANE FUEL CELL

(71) Applicant: The Research Foundation for The State University of New York, Albany, NY (US)

(72) Inventors: Hongfei Li, Port Jefferson Station, NY (US); Miriam Rafailovich, Plainview, NY (US); Cheng Pan, San Jose, CA (US)

(73) Assignee: The Research Foundation for The State University of New York, Albany, NY (US)

( * ) Notice: Subject to any disclaimer, the term of this patent is extended or adjusted under 35 U.S.C. 154(b) by 153 days.

(21) Appl. No.: 14/724,520

(22) Filed: May 28, 2015

(65) Prior Publication Data

US 2016/0043424 A1    Feb. 11, 2016

Related U.S. Application Data

(60) Provisional application No. 62/003,926, filed on May 28, 2014.

(51) Int. Cl.
    *H01M 4/90*    (2006.01)
    *H01M 4/88*    (2006.01)
    *H01M 8/1018*  (2016.01)

(52) U.S. Cl.
    CPC ....... *H01M 4/9041* (2013.01); *H01M 4/8825* (2013.01); *H01M 2008/1095* (2013.01)

(58) Field of Classification Search
    CPC ..... H01M 4/92; H01M 4/9041; H01M 4/8825
    See application file for complete search history.

(56) References Cited

U.S. PATENT DOCUMENTS

| | | | | |
|---|---|---|---|---|
| 6,521,381 | B1* | 2/2003 | Vyas | H01M 4/8885 29/623.5 |
| 8,440,369 | B2 | 5/2013 | Nie et al. | |
| 8,637,208 | B2 | 1/2014 | Son et al. | |
| 2001/0028967 | A1* | 10/2001 | Roberts | H01M 8/04089 429/432 |
| 2005/0053826 | A1* | 3/2005 | Wang | B82Y 30/00 427/115 |
| 2007/0160899 | A1* | 7/2007 | Atanassova | H01M 4/8807 429/413 |

(Continued)

OTHER PUBLICATIONS

Pan, "Gold Nanoparticle Enhancement for Polymer Electrolyte Membrane (PEM) Fuel Cell", Materials Science and Engineering, Abstract, Nov. 2012.

(Continued)

*Primary Examiner* — Jimmy Vo
(74) *Attorney, Agent, or Firm* — Hoffmann & Baron, LLP

(57) ABSTRACT

A proton exchange membrane fuel cell that includes: a positive electrode; a negative electrode; a polyelectrolyte membrane; and platelet-shaped nanoparticles of gold, platinum, palladium, silver, copper or their alloys or mixtures thereof. The polyelectrolyte membrane includes a sulfonated tetrafluoroethylene based fluoropolymer-copolymer and is disposed between the positive electrode and the negative electrode. The nanoparticles contact the surface of the proton exchange membrane increase the efficiency of the fuel cell by at least 50%.

9 Claims, 10 Drawing Sheets

(56) References Cited

U.S. PATENT DOCUMENTS

| | | | |
|---|---|---|---|
| 2009/0082198 A1* | 3/2009 | Mei | B01J 23/6527 |
| | | | 502/310 |
| 2010/0035123 A1* | 2/2010 | Narayanan | C22C 5/04 |
| | | | 429/483 |
| 2012/0264598 A1* | 10/2012 | Carpenter | B22F 9/24 |
| | | | 502/326 |

OTHER PUBLICATIONS

Ralph, "Proton Exchange Membrane Fuel Cells: Progress in Cost Reduction of the Key Components", Platinum Metals Rev., vol. 41:3, pp. 102-113; 1997.

Moreira et al., "Platinum Nanoparticle Deposition on Polymeric Membranes for Fuel Cell Applications", Journal of Physics: Conference Series, vol. 370, pp. 1-11; 2012.

Rajalakshmi et al., "Platinum Catalysed Membranes for Proton Exchange Membrane Fuel Cells—Higher Pertormance", Chemical Engineering Journal, vol. 102, pp. 241-247; 2004.

Isseroff et al., Increasing Polymer Solar Cell Active Layer Efficiency and Organization by Adding Gold-Functionalized Reduced Graphene Oxide, Materials Research Society, Six Pages, 2013.

* cited by examiner

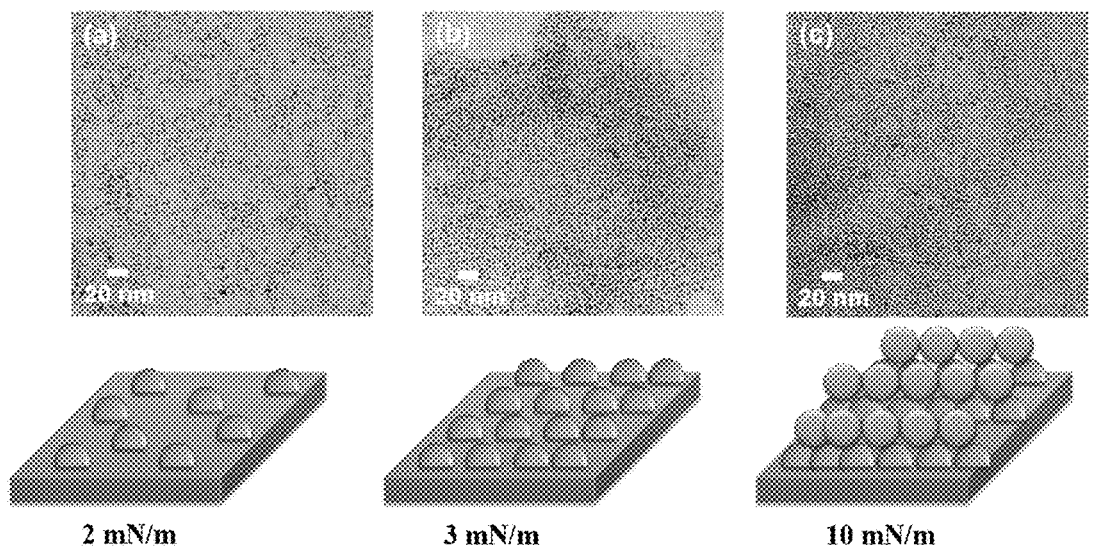
2 mN/m  
FIG. 3
3 mN/m  
FIG. 4
10 mN/m  
FIG. 5
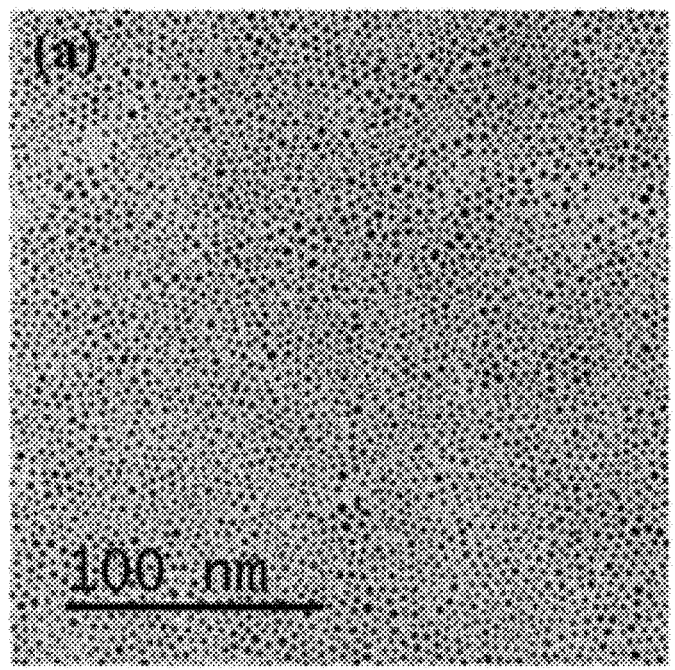
FIG. 6

GOLD NANOPARTICLES-ENHANCED PROTON EXCHANGE MEMBRANE FUEL CELL

This application claims priority from provisional application Ser. No. 62/003,926, filed on May 28, 2014, which is incorporated herein in its entirety.

FIELD OF THE INVENTION

The present invention is a proton exchange membrane fuel cell. In particular, the present invention relates to a proton exchange membrane fuel cell enhanced with platelet-shaped nanoparticles of gold, platinum, palladium, silver, copper or their alloys or mixtures thereof.

BACKGROUND OF INVENTION

The hydrogen fuel cell or proton exchange membrane fuel cell ("PEMFC" or "PEM" fuel cell) is one of the most promising future alternative energy sources, particularly attractive for automobile applications due to its high efficiency, high energy density, and low or zero emissions. However, its relatively low power output has prevented it from many practical applications. Typical applications for PEM fuel cells are backup power, portable power, distributed generation and transportation. The advantages of PEM fuel cells are that they can be used with solid electrolyte, have high power density, a low operation temperature, quick start-up and almost pollution-free emissions. The disadvantages are expensive catalysts, sensitive to impurities and they have low temperature waste heat. The hydrogen gas for the fuel cells can be obtained from natural gas reforming, water electrolysis and photo-catalytic water splitting.

In fuel cells (see FIG. 1), power is generated via the conduction of protons—positively charged hydrogen ions (H+)—through a polyelectrolyte membrane, commonly composed of sulfonated tetrafluoroethylene based fluoropolymer-copolymer (NAFION®). The function of the fuel cell constitutes a balance between hydrogen oxidation and oxygen reduction reactions where platinum (Pt) nanoparticles are used to catalyze the reactions at the electrodes. Under ambient conditions where carbon dioxide ($CO_2$) is present, carbon monoxide (CO) is one of the byproducts of the fuel cell operation, which is produced on the NAFION® membrane as a result of the Pt catalyzed $H_2$ reduction at the anode, or via the reverse water gas shift reaction (RWGS) at the cathode. In either case, the rate constant for oxidation of CO is lower than that for the other reactions, especially below 400K, resulting in accumulation and subsequent migration to the electrodes where amounts, as low as 75 ppm, poison the Pt catalyst and can reduce the power output by more than 50%.

The decreased efficiency of energy conversion of a hydrogen fuel cell is mainly caused by the slow kinetics of the oxygen reduction reaction (ORR) and the presence of contaminants in the fuel stream. The presence of trace amounts of carbon monoxide in hydrogen fuel produced from the reforming process, and via routine operation in $CO_2$ containing ambient atmosphere, can reduce fuel cell efficiency considerably when platinum is the electro-catalyst material. Recently, considerable advances have been made in fuel cell electrocatalysis moving away from conventional Pt catalysts to improved electrocatalysts (mostly nanosized), which have increased the understanding of the reaction kinetics. However, the lack of high efficiency due to contaminants is still one of the major challenges of electrocatalysis, in addition to the problem of the stability of Pt.

It is known that gold nanoparticles (Au NPs) are very effective catalysts of the CO oxidation reaction. An essential condition of this process though is the formation of hemispherical shaped particles in direct contact with metal oxide supports, where a two-step catalytic process is postulated at the perimeter of the particles which reduces the energy barrier and increases the reaction rate. Hence, despite their potential utility, these particles have not been effective in moderating the fuel cell operation since their deposition requires very high temperatures that cannot be achieved on a polymer membrane.

Au nanoparticles can be effective catalysts of the CO oxidation reaction at low temperatures when good contact with certain metal oxide (e.g., titanium dioxide, $TiO_2$) substrates is established. It is believed that the Au nanoparticles are oblate-shaped and form a stepped interface at the contact line with the $TiO_2$ substrate. The atomic steps then provided perimeter sites for adsorption of the reactants which enabled a two-step oxidation process to occur. In this model, the substrate first interacted with the reactants, allowing bond stretching on the support surface. This decreased the barrier to the catalytic process which occurred on active sites at the perimeter of the Au nanoparticles thereby greatly increasing the efficiency and reducing the operating temperature of the CO oxidation reaction. The model was not unique to TiO2 and a similar mechanism was recently proposed for cerium dioxide ($CeO_2$). This type of reaction has not been used to eliminate CO poisoning of PEM fuel cells because the high temperatures involved in formation and deposition of the particles are not practical for implementation on polymer membranes and, hence, incorporation into PEM fuel cells was never attempted.

A PEMFC is a device that can directly convert the chemical energy in hydrogen to electrical energy at low temperature in the presence of catalysts. A polymer membrane, usually a NAFION® membrane, is utilized to separate ions and electrons, while two electrodes that contain loadings of carbon black and platinum (Pt) catalysts are placed at both sides of the membrane. Nanoparticles are common catalytic components of fuel cells. Most catalysts are loaded on the electrodes to catalyze the reaction. Platinum is the most common and efficient catalyst for PEM fuel cell, but Pt is precious and expensive. Generally, the two desired reactions that occur in hydrogen fuel cells are the hydrogen oxidation reaction (HOR) at the anode and the ORR at the cathode. The HOR occurs readily on Pt-based catalysts (rate constant~$10^{-5}$ molsec$^{-1}$cm$^{-2}$) and, in a fuel cell, is usually controlled by mass transfer limitations. The ORR actually can proceed by two pathways in aqueous electrolytes, which is called "four-electron pathway," and the other one is known as the peroxide or "two-electron" pathway ($O_2 + 2H^+ + 2e^- \rightarrow ^* H_2O_2$).

A polymer membrane, which is usually made out of NAFION®, is used to separate ions and electrons in hydrogen fuel cell. NAFION® is a sulfonated tetrafluoroethylene based fluoropolymer-copolymer. A tetrafluoroethylene (TEFLON®) backbone gives NAFION® its mechanical strength while the pendent sulfonate groups facilitate ion conduction. NAFION® does not conduct electrons, but does allow positive ions, typically protons in PEM cells, to pass through via interaction with clusters of sulfonate-ended perfluoroalkyl ether groups. The structure of these clusters is still under investigation and has been proposed to result from assemblies ranging from inverted micelles to cylindrical nanochannels. In all of the proposed models, channels with —$SO^{-3}$ groups facilitate transport of positively charged species.

Operating a fuel cell with pure hydrogen exhibits the best power output; however, pure hydrogen is very expensive and difficult to store. Alternatives to pure hydrogen usually come from reformed hydrogen gas from natural gas, propane, or alcohols. Even though the reformed gas is purified, some contaminants, such as CO and $CO_2$ species can persist in the gas feed. CO can poison the catalyst by blocking active sites on the catalyst's surface. Consequently, sites are no longer available for hydrogen adsorption and subsequent oxidation. It is known that when CO content is larger than 25 ppm, it has severe effects on Pt catalysts. CO poisoning can also occur when air is blown in the cathode, where $CO_2$ in the air can be reduced to CO and, therefore, block the active Pt sites on the cathode.

Accordingly, there is a need for PEMFC that can operate using reformed gas containing contaminants without an intermediate purification step to remove the contaminants. There is also a need for a PEMFC that have high output power and are cost efficient to operate.

SUMMARY OF THE INVENTION

In accordance with the present invention, a proton exchange membrane fuel cell is provided. The proton exchange membrane fuel cell includes: a positive electrode; a negative electrode; a polyelectrolyte membrane; and platelet-shaped nanoparticles of gold, platinum, palladium, silver, copper or their alloys or mixtures thereof. The proton exchange membrane fuel cell can also include a gaseous composition containing hydrogen molecules ($H_2$) and carbon dioxide ($CO_2$) that contacts the anode. The polyelectrolyte membrane is disposed between the positive electrode and the negative electrode and the nanoparticles contact the surface of the proton exchange membrane. The polyelectrolyte membrane includes a sulfonated tetrafluoroethylene based fluoropolymer-copolymer. The nanoparticles increase the efficiency of the fuel cell by at least 50%.

The nanoparticles have an average particle diameter of from 1.0 nm to 5.0 nm, preferably 1.5 nm to 4.5 nm and most preferably 1.88 nm to 3.54 nm. Preferred nanoparticles have a truncated cuboctahedron structure. The nanoparticles can be in the form of a film and the film can have a crystalline structure. Preferably, the film has a thickness of from 1.2 nm to 2.2 nm.

The invention also includes a method for making a proton exchange membrane fuel cell. The method includes forming an polyelectrolyte membrane having a surface; preparing a solution comprising platelet-shaped nanoparticles of gold, platinum, palladium, silver, copper or their alloys or mixtures thereof; spreading the solution of nanoparticles onto a surface of water; compressing the solution of nanoparticles to form a film; coating the surface of the polyelectrolyte membrane with the film; and disposing the polyelectrolyte membrane with the film coating between a negative and positive electrode. The polyelectrolyte membrane can include a sulfonated tetrafluoroethylene based fluoropolymer-copolymer.

The nanoparticles have an average particle diameter of from 1.88 nm to 3.54 nm and, preferably, have a truncated cuboctahedron structure. The solution of nanoparticles can include a solvent, preferably toluene. The solution of nanoparticles is compressed at a pressure of from 0.5 to 3.0 mN/m, preferably from 1.0 to 2.0 mN/m, to form the film.

The film can have a crystalline structure and can also have a thickness of from 1.2 nm to 2.2 nm, preferably about 1.4 nm.

BRIEF DESCRIPTION OF THE FIGURES

The preferred embodiments of the proton exchange membrane fuel cell of the present invention, as well as other objects, features and advantages of this invention, will be apparent from the accompanying drawings wherein:

FIG. 3 is a TEM image and graphical depiction of an LB film of gold nanoparticles at a surface pressure of 2 mN/m.

FIG. 4 is a TEM image and graphical depiction of an LB film of gold nanoparticles at a surface pressure of 3 mN/m.

FIG. 5 is a TEM image and graphical depiction of an LB film of gold nanoparticles at a surface pressure of 10 mN/m.

FIG. 6 is a TEM image of gold nanoparticles with an average core size of 2.71 nm.

DETAILED DESCRIPTION OF THE INVENTION

Figure 1:
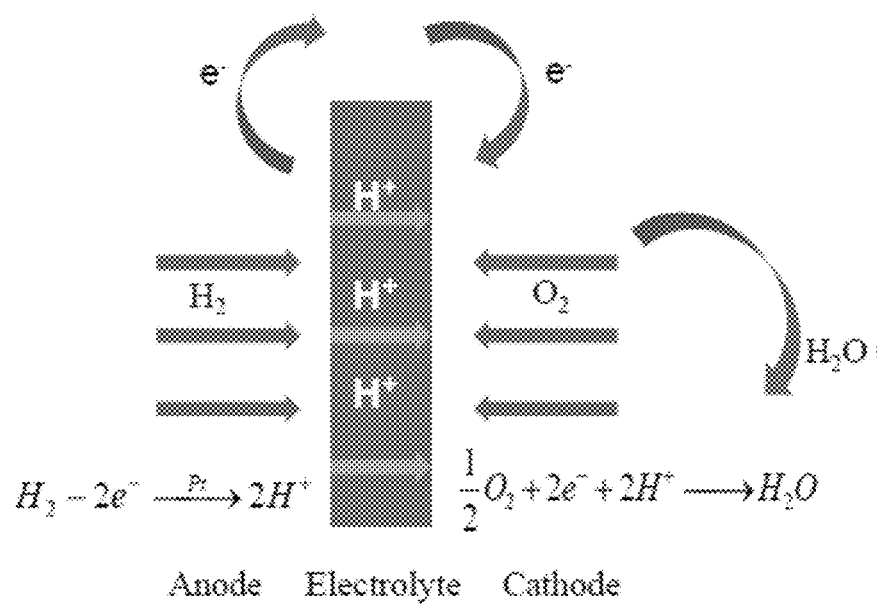
FIG. 1 is a diagram of a typical prior art fuel cell.

One objective of the present invention is to improve the fuel cell efficiency in the presence of contaminants by using a co-catalyst, or exploiting a "two step catalysis" concept, where the catalyst support becomes an active participant to enhance the efficiency of the catalytic process. The process is based on initial bond stretching of the reactants on metal oxide supports, which reduces the reaction barrier and facilitates the action of the catalyst. Even though the applicability of this concept to operation of the PEM fuel cells was highlighted, its implementation in an actual device was not practical since the high temperature synthesis and deposition processes which were not compatible with the polymer membranes involved in the ion transport process.

Gold nanoparticles that are platelet shaped and have direct contact to the substrate have been found to be the perfect catalysts. It has also been found that platelet-shaped nanoparticles of platinum, palladium, silver, copper or their alloys or mixtures thereof can be used in place of gold. In one embodiment of the present invention, hydrophobic, thiol-functionalized gold nanoparticles are synthesized through two-phase method. When particle solution is spread at the air water interface, EXAFS spectroscopy indicates that some of the gold atoms are removed, as the water displaces the hydrophobic thiol chains from the particle surface, resulting in platelet shaped particles. Furthermore, after these nanoparticles are spread on the surface of water in a Langmuir-Blodgett ("LB") trough where surface pressure can be applied to compress them, they form LB film consisting of one or more monolayers. This LB film can then be deposited onto a solid surface, such as the NAFION® membrane where the particle surface can make direct contact with electrodes and take effect. It has also been found that the optimal surface pressure for forming gold nanoparticles monolayer to achieve the highest enhancement of output power is between about 0.5 and 3.0 mN/m, preferably between about 1.0 and 2.0 mN/m.

The present invention is a method for producing hemispherical particles 2.71±0.83 nm in diameter and 1.7 nm thick. The particles are formed using the Langmuir method the air/water interface and deposited as a uniform film on the NAFION® membranes of the fuel cell membrane electrode assembly (MEA). The coated membranes of the present invention enhance the current and power output of PEMFCs, operated under ambient conditions, by more than 50%, without a corresponding increase in voltage. Density functional theory (DFT) calculations indicate that the particles, working in synergy with the $SO_3$ functional groups on the NAFION® membrane reduce the activation barrier and increase the reaction rate constant for CO oxidation, which was the rate limiting step at room temperature. The calculations indicate that the NAFION® membrane participates in the two step catalysis process of the reverse gas shift reaction in the same manner as Au deposited on metal oxides.

In one embodiment, oblate shaped Au particle nanoplatelets, with an aspect ratio of approximately two and only three atomic layers thick, are reproducibly formed at the air water interface, and then coated as a film onto any arbitrary surface simply by using the Langmuir-Blodgett technique. When this film is deposited directly onto the membrane of a PEM fuel cell, the efficiency of the cell is enhanced by more than 50%, when operated under ambient conditions. This enhancement occurs only when the particles are placed as a single layer, in direct surface contact with the NAFION® membrane, in a manner similar to the complexes reported on $TiO_2$. It was believed that the two step catalysis process also occurs on the NAFION® membrane, where the oxidation of CO at the perimeter of the Au nanoparticles is facilitated by the sulfonic groups present on the NAFION® polymer. These results are consistent with DFT calculations, which show that activation barrier for CO oxidation by the gold-sulfonic group complex temperature is reduced to 11.94 Kcal/mole, enabling the reaction to occur at room temperature.

In another embodiment, hydrophobic, thiol-functionalized gold nanoparticles were synthesized through a two-phase method. A gold nanoparticles layer with three atomic layers thick at the air water interface was then formed. After these nanoparticles are spread on the surface of water in a Langmuir-Blodgett trough where surface pressure can be applied to compress them, they form LB film consisting of one or more monolayers. These Au particles were then directly deposited onto the NAFION® membrane in the PEM fuel cell, resulting in 80% enhancement of the efficiency of the fuel cell. It was found that this kind of enhancement occurs only when the particles are in direct surface contact with the membrane and does not occur when the nanoparticles are incorporated into the electrodes.

The most efficient location for the Au or Pt catalysts is on the membrane, which shortens the pathway that ions need to travel and, thus, increases the efficiency of separating ions and electrons. Gold nanoparticles, which are platelet shaped and have direct contact to the substrate, possess special catalytic capabilities. The activity of gold nanoparticles increases when the particle size shrinks, which is due to the increasing fraction of corner atoms. Gold nanoparticles are known to be very effective for the oxidation of carbon monoxide (CO). Reducing the size of gold nanoparticles to around 2 nm increases the activity of gold nanoparticles.

EXAMPLES

The examples set forth below serve to provide further appreciation of the invention but are not meant in any way to restrict the scope of the invention.

Example 1

A two-phase (water-toluene) method was used to form gold nanoparticles. First, $HAuCl_4$/water was mixed with tetraoctylammoniumbromide (TOABr)/toluene to form a two-layer solution. 1-Dodecanethiol and sodium borohydride ($NaBH_4$) were added and vigorously stirred. The mixture was left in a refrigerator overnight to precipitate. Thermally stable and air-stable gold nanoparticles of reduced dispersity and controlled size (1.5-3 nm) were obtained. These platelet gold nanoparticles were directly deposited onto a membrane. They could also have been formed into a film before being deposited on the membrane.

Example 2

Thiol functionalized gold nanoparticles (AuNP) were synthesized via the two-phase method. A 1 mg/ml AuNPs/toluene solution was prepared and 200 μL were spread onto the surface of water by a glass syringe. The surface pressure versus area (π-A) isotherms of the AuNP solution were measured using a KSV 5000 LB trough at room temperature.

Figure 2:
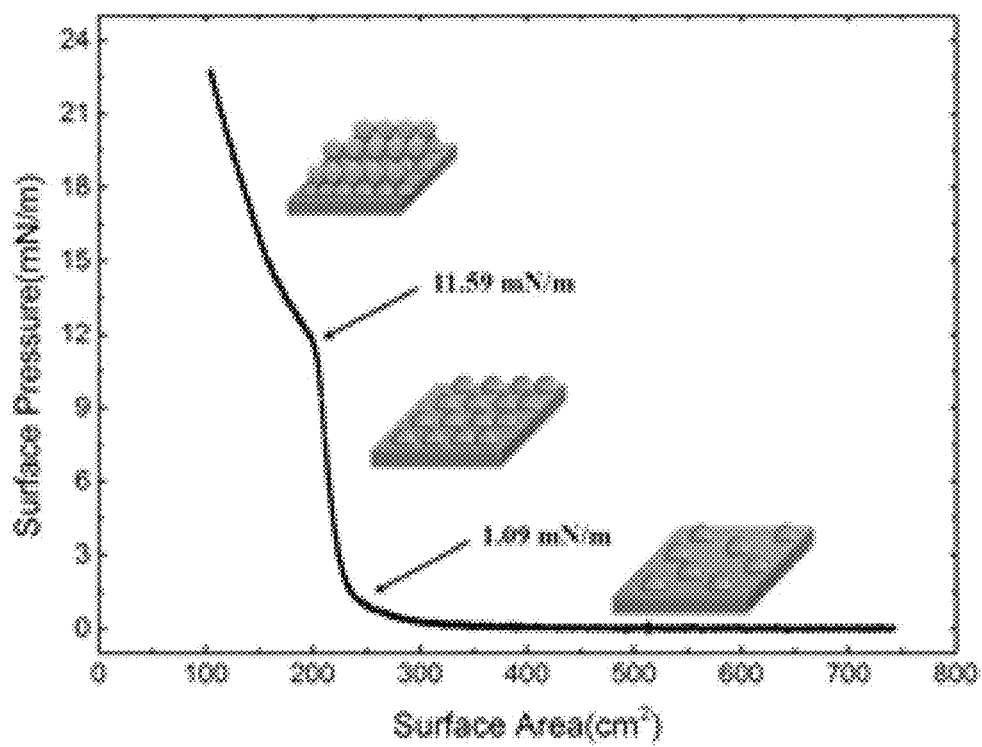
FIG. 2 is a graph showing the surface pressure/area relationship of as-prepared gold nanoparticles by using Langmuir-Blodgett trough.

The results are shown in FIG. 2, which shows that the film is fully compressible up to a pressure of 1.09 mN/m. Above this pressure, the film becomes much more difficult to compress, and finally collapses above a pressure of 11.59 mN/m. In order to visualize the internal ordering of the particle films and determine the mean radius of the particles, films obtained at different pressures were lifted onto TEM grids and imaged. FIGS. 3-5, show that at a surface pressure 2 mN/m the film still has a great deal of empty space, which at 3 mN/m appears to be nearly completely closed. If further pressure is applied, the film immediately buckles (see graphical depictions in FIG. 2). This isotherm is consistent with previous results for palladium (Pd) nanoparticles synthesized in the same manner, wherein it was observed that the thiol coated particles first self-assemble into small areas that are subsequently compressed into a solid layer. Rather than being uniformly distributed, as in a true gas phase, the thiol functionalized particles coalesce into small well-ordered patches interspersed with large areas of free water. As the pressure is increased, the patches come closer, displacing the free areas, until an incompressible solid particle monolayer film is formed. Further increase in pressure results in buckling of the film. The transmission electron microscope (TEM) images show that the particles form films with patches where close packed local order is observed among the particles. With increasing pressure, a uniform film is formed with long ranged close packed order, which collapses into multiple, disordered segments at the highest pressure.

Figure 7:
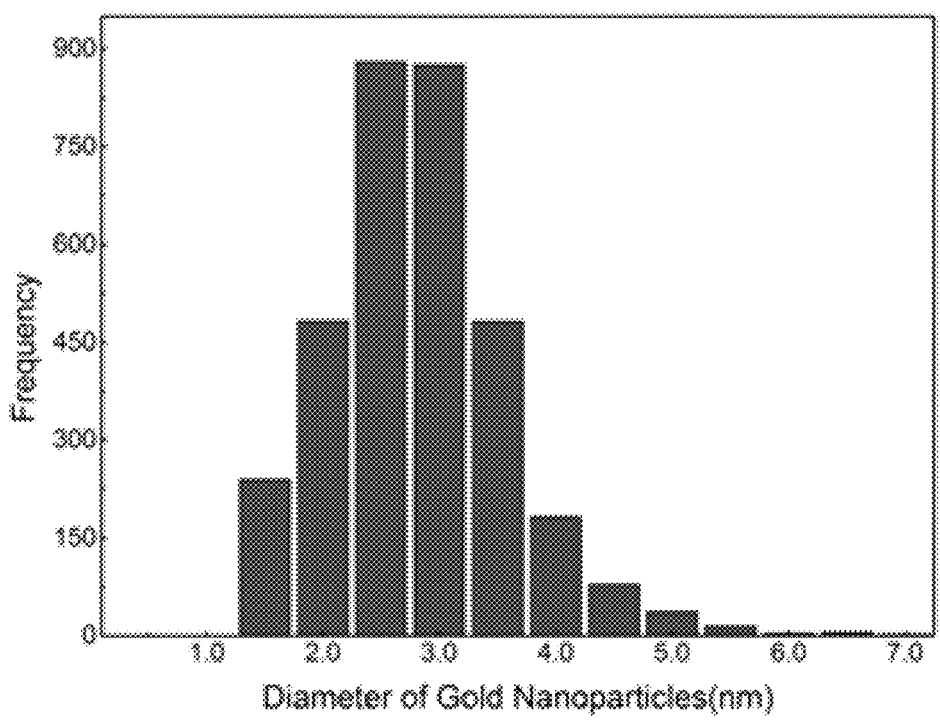
FIG. 7 is a core size distribution histogram of gold nanoparticles with an average core size is 2.71 nm.
Figure 8:
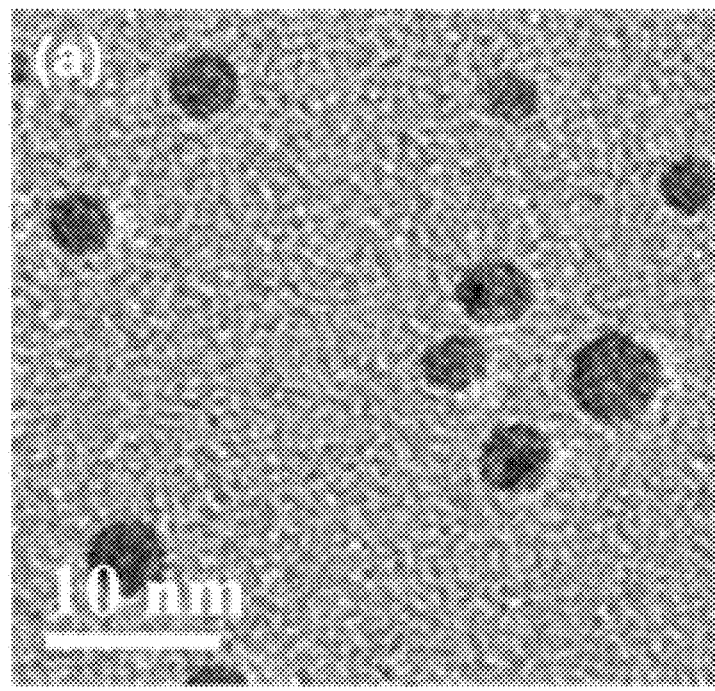
FIG. 8 is a high-resolution transmission electron microscope (HRTEM) image of thiol-stabilized gold nanoparticles.
Figure 9:
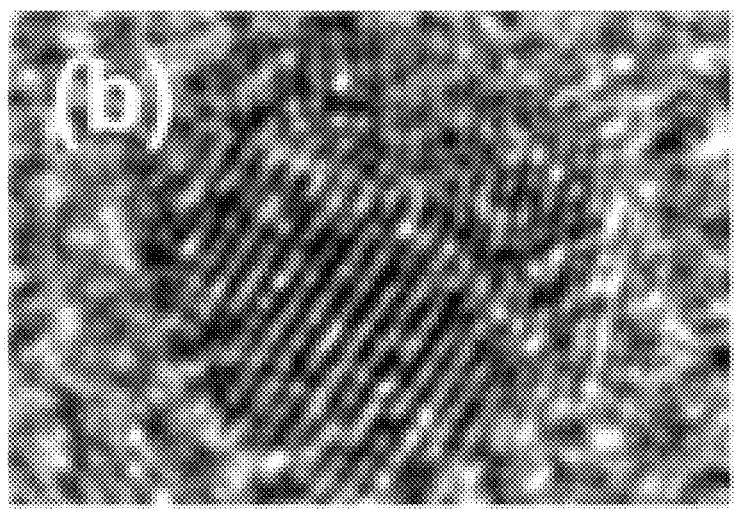
FIG. 9 is magnified image of one of the thiol-stabilized gold nanoparticles shown in FIG. 8.
Figure 10:
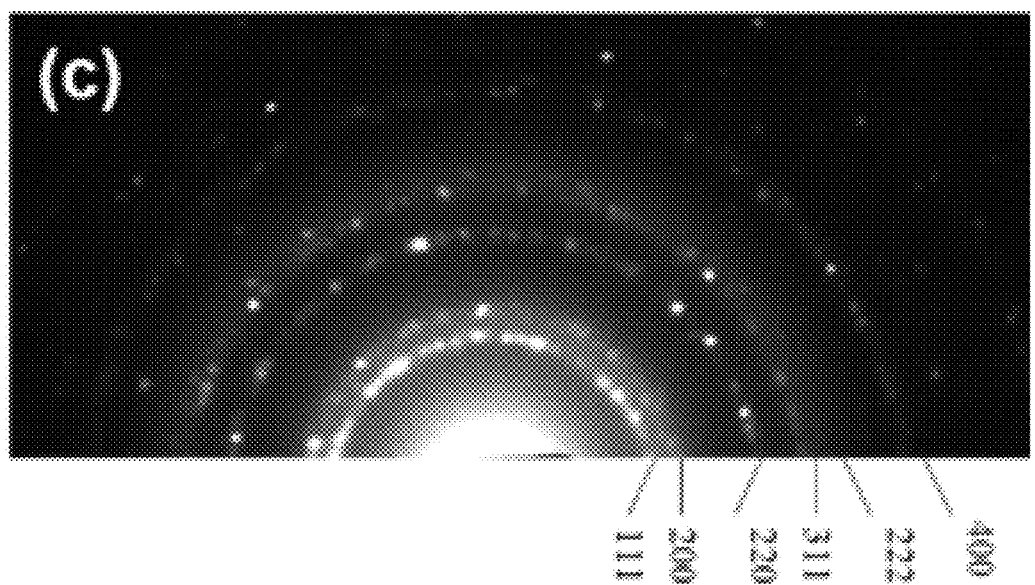
FIG. 10 is an electron diffraction image of the thiol-stabilized gold particle shown in FIG. 9.

The particle sizes were obtained by analyzing the image of the film shown in FIG. 6, which was lifted off the surface onto a TEM grid at the center of the $\pi$–A isotherm, where the incompressible monolayer is formed at a pressure of $\pi$=3 mN/m. The average particle diameter, d=2.71±0.83 nm, obtained from the histogram shown in FIG. 7, is consistent with that previously reported. Very long ranged order is observed across the entire image, where the particles are assembled in close packed order, with a spacing of 1.2 nm between the perimeters of the particles which can be obtained from the Fast Fourier Transform (FFT) of the image. The crystalline orientation of the particles lifted from the air water interface was further analyzed using high resolution TEM. The image of a typical particle is shown in FIGS. 8-10, which show that the diffracted image corresponds to a twinned single crystal where the two facets are joined at 26°. The electron diffraction images are consistent with a face-centered cubic (FCC) orientation with a lattice of a=4.07 Å, which is the same as that of bulk gold (a=4.0786 Å). Extended X-ray Absorption Fine Structure (EXAFS) spectra obtained previously from AuNP and PdNP films synthesized by the Brust method and lifted from the air/water interface onto kapton supports, indicated that the particles were not spherical, but rather had a truncated cuboctahedron structure, with a 2:1 aspect ratio and with a thickness of t=1.43 nm, that was nearly half the particle diameter.

Figure 11:
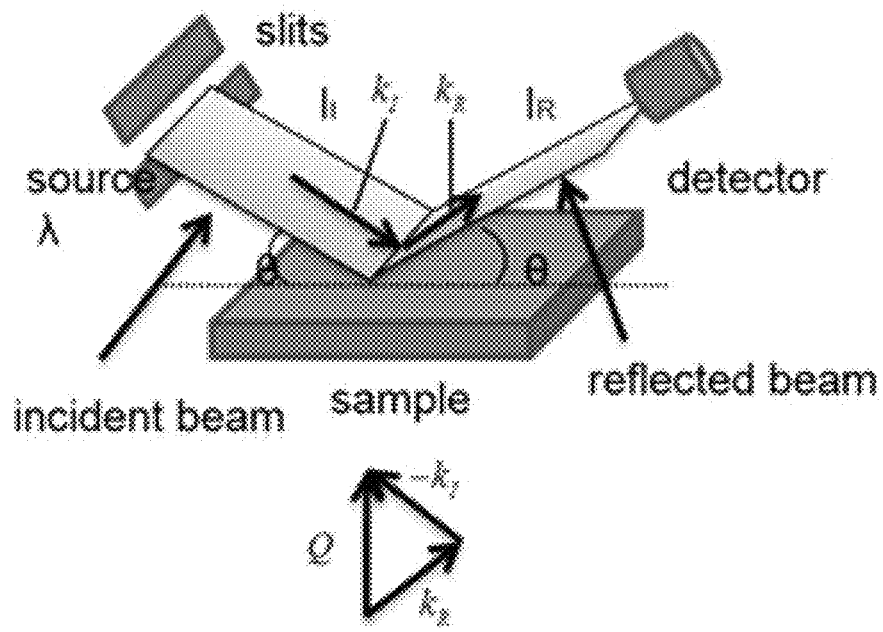
FIG. 11 is a graphical depiction of X-ray reflectivity measurement showing the scheme of X-ray reflectivity principle.
Figure 12:
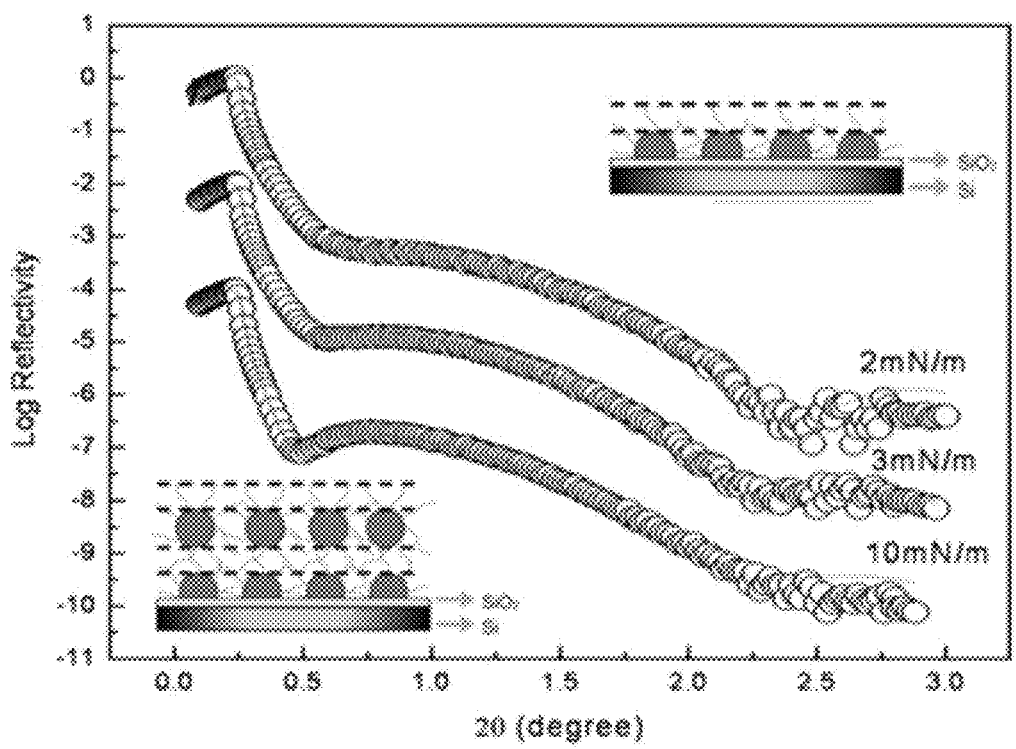
FIG. 12 is a graph of reflectivity showing the X-ray reflectivity original curve (bubbles) and fit curve (red line).

In order to determine the thickness of the particles in the films used to coat the NAFION® membrane, the films were also lifted onto native oxide covered Si wafers at pressures of 2 mN/m, 3 mN/m and 10 mN/m. The profiles were then measured using X-ray reflectivity (see FIG. 11) and the data together with the fitted curves are shown in FIG. 12 and used to approximate a thickness of 1.58 A for the monolayer film in direct contact with the substrate surface. For the collapsed film two layers are observed, the one in contact with water is 1.70 nm, and a second layer 3.74 nm, or nearly twice the thickness, is formed above it. This indicates that only the layer in contact with the substrate surface is oblate, but as the layer is lifted off the surface recombination of the particles to their spherical shape occurs. This layer was found to have thiols only at the air interface and appeared to have only Au at the $SiO_2$ interface. At the high pressures, the data was best fit to a two layer model, where the first layer was similar in thickness to the monolayer samples, and a second layer, nearly twice the thickness of the first layer, and separated by a layer of thiols, is seen to form above it. The x-ray reflectivity results were also confirmed using TEM analysis of the films lifted from the LB trough. The thickness of the particles deduced from EXAFS was in good agreement with that measured from reflectivity. The data indicates that the Au/water interface is highly unstable and, when collapsed, the particles recombine to form a layer with the same thickness as the original particles. Hence, these particles also had the potential of being highly reactive, and effective at catalyzing.

Example 3

Figure 13:
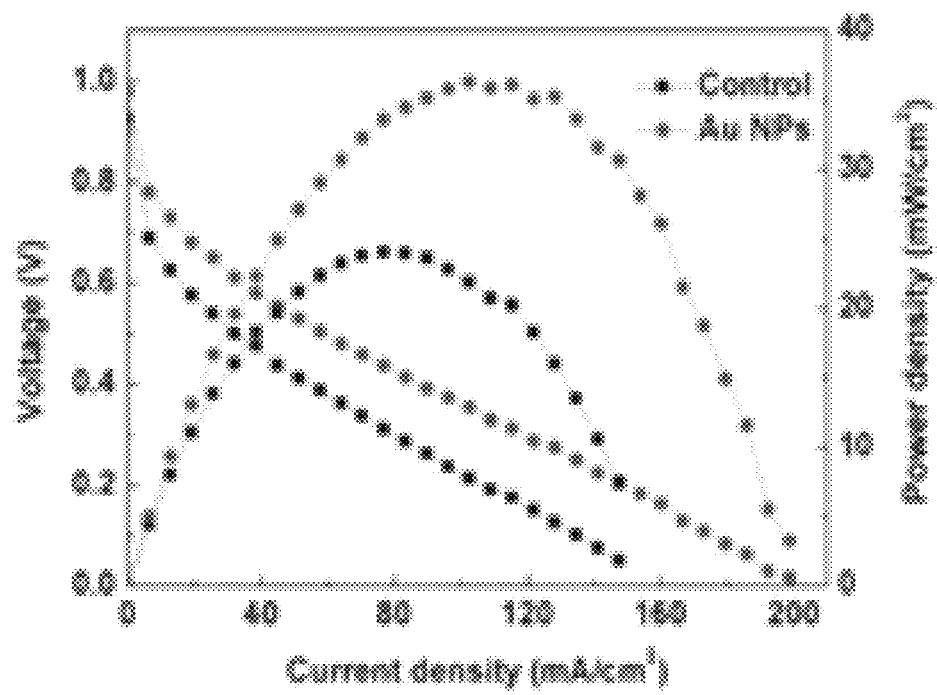
FIG. 13 is a graph of the performance measurement (voltage vs. current density) for a single stack fuel cell without appearance of Au nanoparticles, wherein the gold nanoparticles were deposited onto NAFION® membrane at a surface pressure of 3 mN/m.
Figure 14:
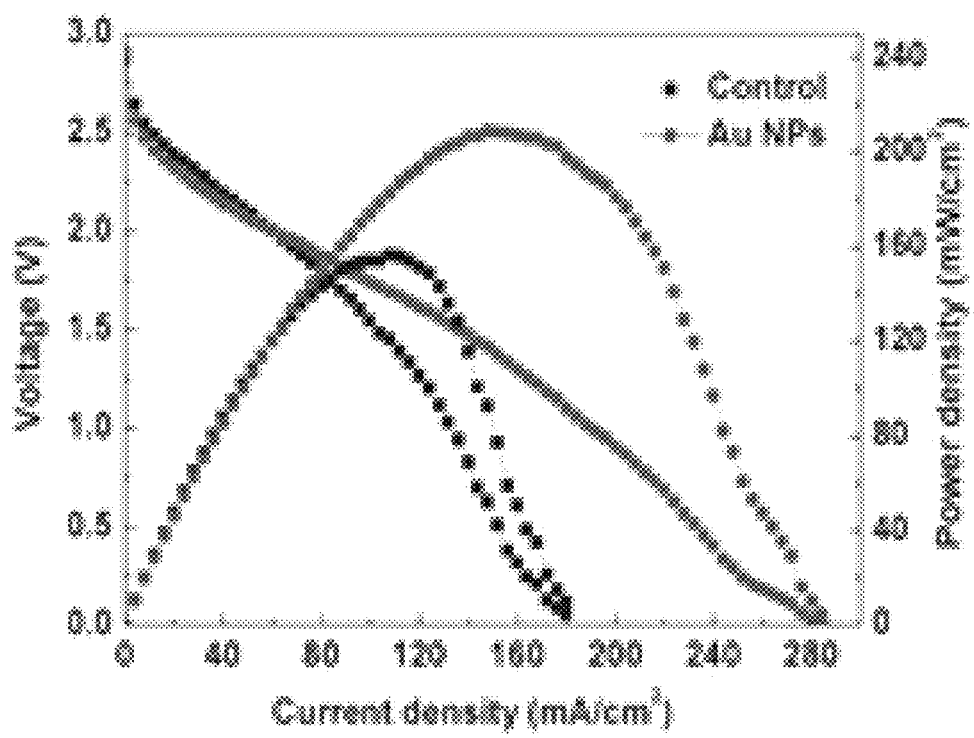
FIG. 14 is a graph of the performance measurement (voltage vs. current density) for a three stacks fuel cell without appearance of Au nanoparticles, wherein the gold nanoparticles were deposited onto NAFION® membrane at a surface pressure of 3 mN/m.
Figure 15:
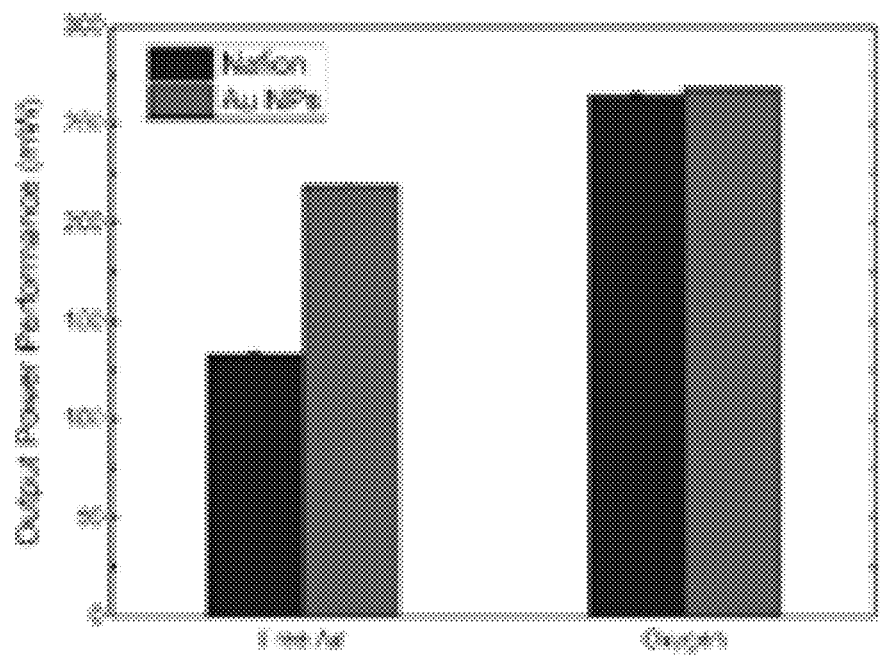
FIG. 15 is a bar graph comparing the performance measurement in terms of output power of a NAFION® membrane and a NAFION® membrane with Au NPs in air and in oxygen.

Gold nanoparticles (Au NPs) were lifted onto NAFION® membranes, as shown, where a layer was deposited onto both sides of the membrane. Membranes with and without Au NPs coatings were then inserted into a single step PEM fuel cell, where the power output could be measured across a variable resistance bridge. The optimum $H_2$ flow rate, was first determined and found to be 80 ccm ($cm^3$/min), regardless of whether the membranes were coated or uncoated. The I-V curves together with the power density were measured as a function of load and the data for a single step cell is plotted as a function of output current in FIG. 13. The figure shows that cell maximum power output was increased by the presence of NPs from 24 $mW/cm^2$ to 36 $mW/cm^2$, while the maximum current was increased from 160 $mA/cm^2$ to 200 $mA/cm^2$, or 50% and 25% respectively. FIG. 14 shows a plot of the results for the membranes in a three step cell were coated with particles. The graph shows an enhancement of 40% and 55% as well indicating that the stack construct does not interfere with the processes upon which the Au NPs are acting. FIG. 15 is a bar graph comparing the performance measurement in terms of output power of a NAFION® membrane and a NAFION® membrane with Au NPs in air and in oxygen.

In some cases the Au NPs were deposited directly on the electrodes without subsequent deposition on the membrane. No enhancement of the power output was observed in this case. Hence, it was deduced that the process upon which the Au NPs were acting involved direct contact with the membrane.

Example 4

Figure 16:
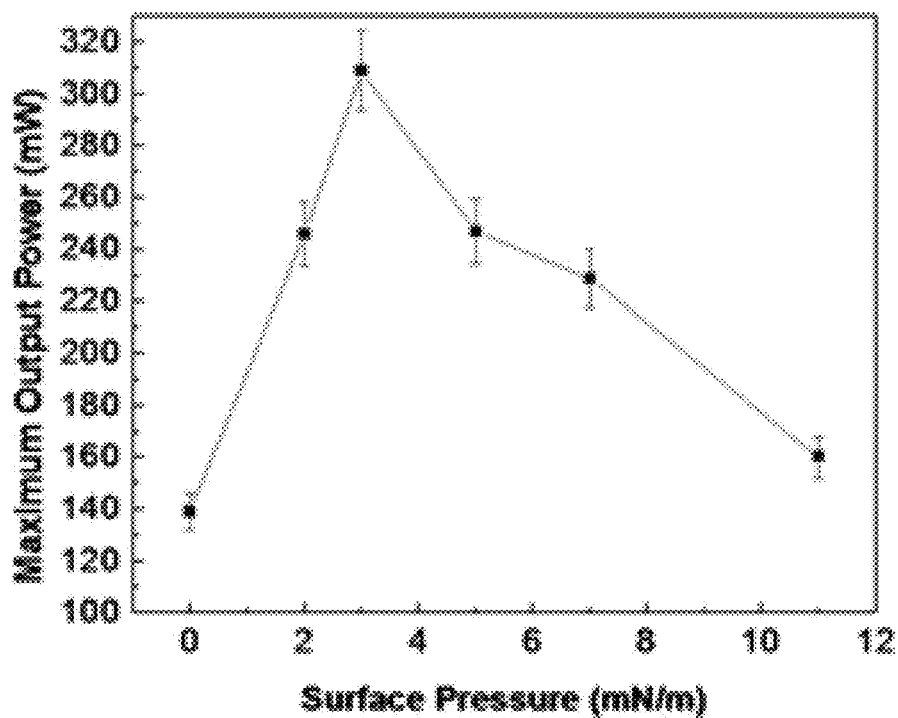
FIG. 16 is a graph showing the surface pressure dependence for output power of PEM fuel cell.

FIG. 16 shows the plot for the maximum power output as a function of the pressure with which the Au NPs were lifted from the air/water interface. The figure illustrates how the max power rises monotonically with surface pressure until the pressure corresponding to a complete surface monolayer is reached. An increase in surface pressure, which results in bilayers formation, decreases the maximum power so that when multiple layers have formed the output is reduced to that of the uncoated control. The x-ray reflectivity results showed that only the first monolayer is in direct contact with membrane. The results show that the power is directly proportional to the surface coverage, as long as a monolayer has not formed. Once the monolayer has formed the output decreases in direct proportion to the formation of the second layer, which seems to block the effect produced by the first layer.

Figure 17:
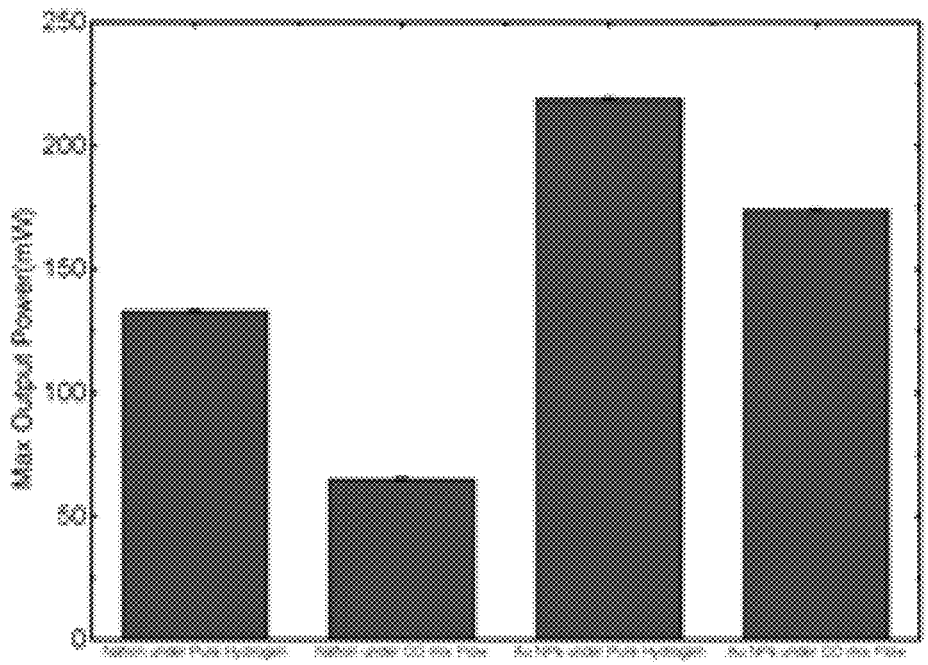
FIG. 17 is a bar graph showing the maximum output power of PEM fuel cell having a NAFION® membrane and a NAFION® membrane with Au NPs under mixture gases with 0.1% CO.
Figure 18:
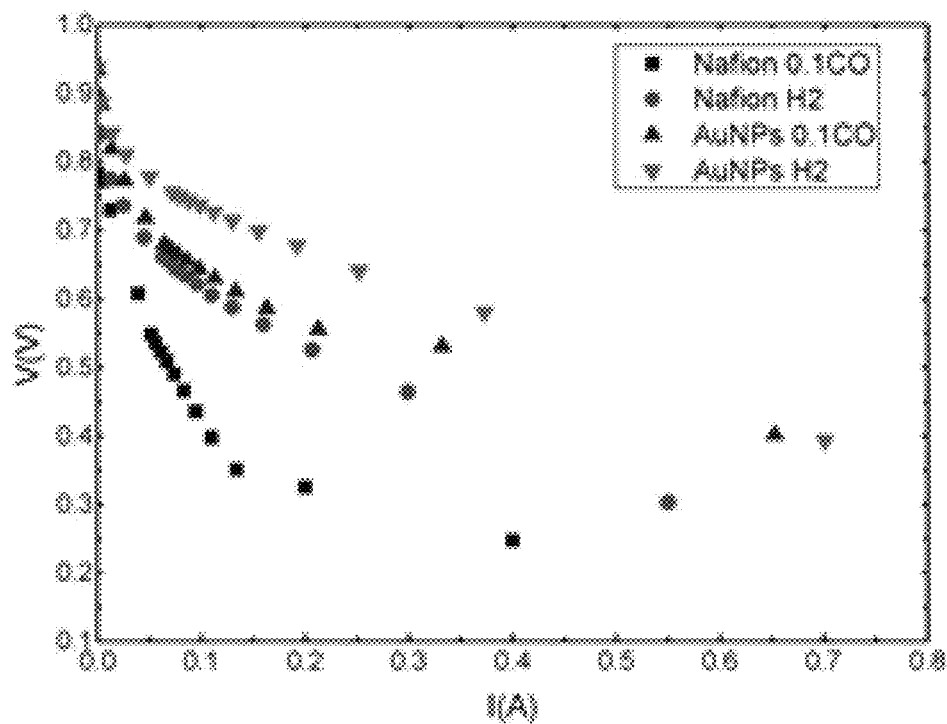
FIG. 18 is a graph showing the performance measurement (voltage vs. current) for a single stack fuel cell having a NAFION® membrane and a NAFION® membrane with Au NPs under mixture gases with 0.1% CO and H2.

Au NPs are known to be very effective for catalyzing the CO oxidization reaction. However, the current output of these cells is limited by the buildup of the CO products on the membrane. Hence, it was deduced that the Au NPs on the membrane were effective in catalyzing the oxidation of CO back to $CO_2$, and only the oblate shaped particles were effective in the catalysis. In confirm this hypothesis, the differential in performance between coated and uncoated particles was measured when the cell was operated in an $O_2$ atmosphere at the output rather than ambient conditions. The data, plotted in FIGS. 17 and 18 show that the overall output of the cell increased, but the relative enhancement, as defined by $$\frac{P_{np} - P_{control}}{P_{control}} \times 100\% \quad \text{(Eq. 1)}$$

decreased due to the nanoparticles, indicating that the particles were indeed operating on the $CO_2$. The differential output was measured when the cell was operated in a mixed stream of gases with 0.1% CO. The results are shown in FIG. 17 and confirm that when CO gas is added, the overall performance is decreased according to the poison effect of CO on the catalyst. 0.1% CO to the feed flow stream is seen to reduce the power output of the cell by 51.1% in the absence of Au NPs, but only 20.5% when the particles are present. The V-I curve in FIG. 18 shows that without Au NPs, the performance drops quickly to 0.25 V when fuel cell is exposed to CO mixture flow compared to the slow decrease to 0.4V with an Au NPs coating. Since typical streams of unpurified $H_2$ gas from syngas contain approximately 20%-25% $CO_2$, these results indicate that the hydrogen produced is adequate for operating the PEM fuel cells without necessitating the final and costly Pt membrane purification step.

The unrestricted DFT calculations were performed using the DMol$^3$ code (DMol3 is a commercial software package which uses density functional theory with a numerical radial function basis set to calculate the electronic properties of molecules, clusters, surfaces and crystalline solid materials from first principles). The ionic cores were described by effective core potentials (ECP). A numerical basis set was used with comparable accuracy to a Gaussian 6-31G (d) basis set. A local basis cutoff of 5.0 Å in real space was employed. The generalized gradient approximation (GGA) with PW91 functional was utilized. The transition state (TS) was located by synchronous transit methods. The Linear Synchronous Transit (LST) was conducted to bracket the maximum between the reactants and products, followed by repeated conjugate gradient minimizations and the Quadratic Synchronous Transit (QST) maximizations until a transition state was located. The convergence thresholds were set as that the root mean square (rms) forces on the atoms were smaller than 0.002 Ha/Å. Such methods yield results close to those obtained by eigenvector following methods.

Figure 19:
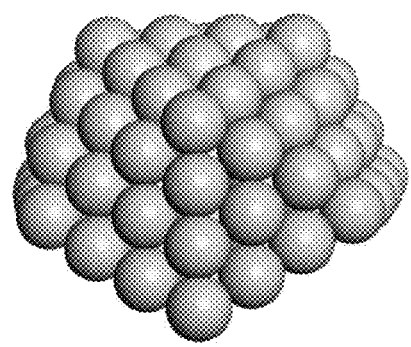
FIG. 19 is a graphical depiction of a DFT-optimized structure for a 2 nm Au nanoparticle.
Figure 20:
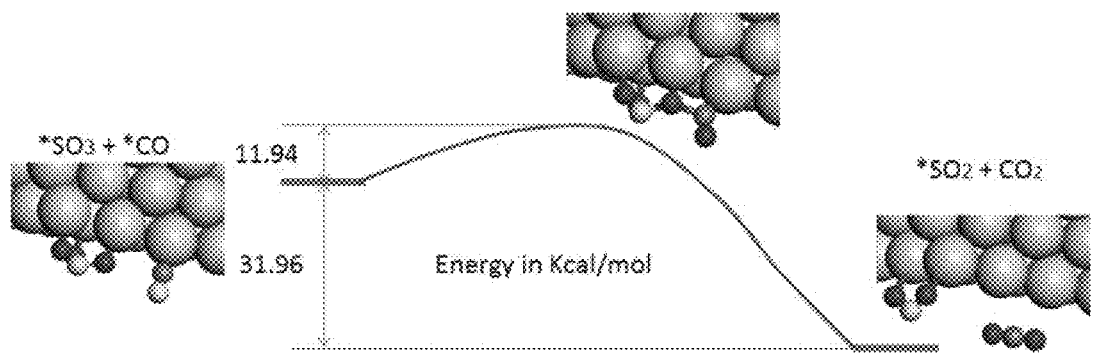
FIG. 20 is a graphical depiction of a DFT-calculated transition and rate constant as a function of temperature (T).

DFT calculations were carried out to understand the origin of improved output power by direct depositing Au NPs on NAFION® membranes. Au NP with 3-atomic layer in height and 2 nm in size was constructed to model (FIG. 19) the experimentally synthesized Au NPs generated by spreading thiol-functionalized spherical Au NPs at the air-water interface. The Au-NAFION® interaction was simulated by adsorbing a $SO_3$-containing group, which is attached at end of NAFION® side chains. CO oxidation to $CO_2$ was studied, assuming that the facile removal of CO in the solution by Au NPs can help to release the CO poisoning on the active Pt sites and increase the overall conversion. The results show that the $SO_3$ species provided by NAFION® play an essential role, being able to effectively oxidize CO to $CO_2$ at the perimeter sites of Au NPs and reduce the amount of CO. The $SO_3$ species are strongly adsorbed at the low-coordinated Au sites via the three terminal oxygen atoms. The barrier ($E_a$) for oxidizing the adsorbed CO nearby ($SO_3+CO \rightarrow SO_2+CO_2$) is only 11.94 Kcal/mol (FIG. 20). Without $SO_3$, the removal of CO on the Au NP via the water-gas reaction (WGSR, $H_2O+CO \rightarrow H_2+CO_2$) is energetically very difficult on both Au and Pt catalysts, e.g. the highest $E_a$ for the WGSR on an Au NP is 29.75 Kcal/mol. According to the calculated barriers, the rate constant for CO oxidation on the Au NP was estimated roughly via $$\frac{k_b T}{h} e^{\left(-\frac{E_a}{k_b T}\right)}.$$

Figure 21:
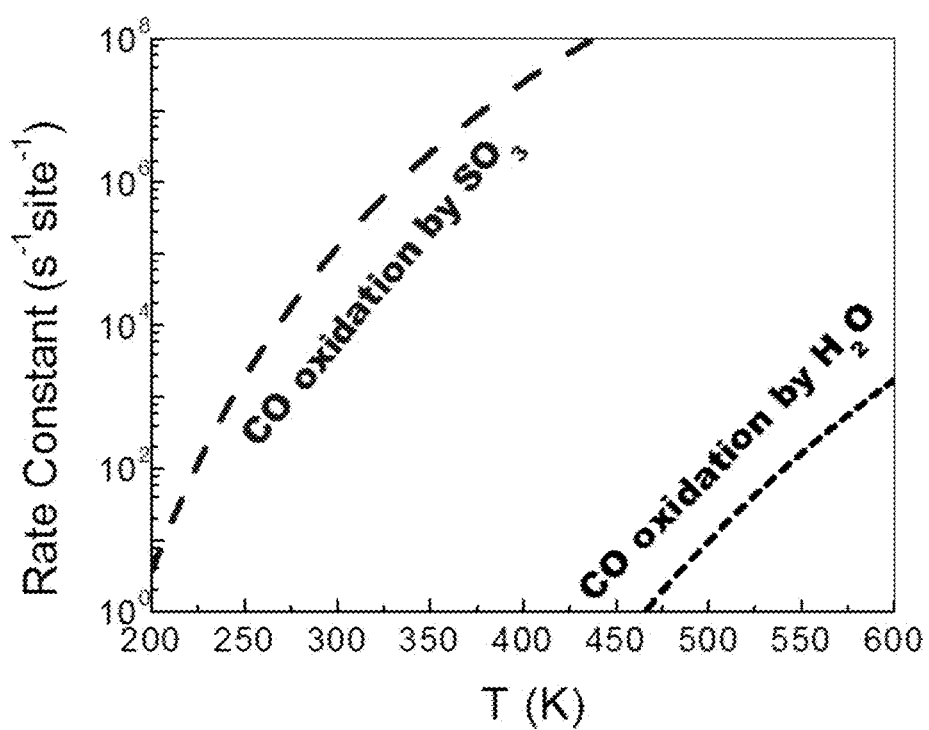
FIG. 21 is a graph of rate constant versus temperature for CO oxidation on an Au NP by $SO_3$ and $H_2O$.

As shown in FIG. 21, the rate constant decreases depending on the oxidant used, $H_2O \ll SO_3$, which leads to the decrease of reaction temperature from 539 K to 223 K to achieve a rate constant of $10^2$ s$^{-1}$site$^{-1}$ for instance. In view of these results, the direct interaction between Au and NAFION® membranes is necessary to facilitate the CO oxidation and therefore release the CO poisoning, where Au NPs act as an active oxidation catalyst and the NAFION® provides the efficient oxidant.

By using LB film technology, it is possible to produce oblate Au NPs which act as highly efficient catalysts for the water/gas shift reaction when plated onto the NAFION® membrane of fuel cells. The particles minimize the decrease in fuel efficiency when highly impure streams of $H_2$ gas are used, making the technology of PEM fuel cells more accessible for large scale use.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A proton exchange membrane fuel cell comprising:
   a positive electrode;
   a negative electrode;
   a polyelectrolyte membrane having a surface and disposed between the positive electrode and the negative electrode; and
   a film of oblate-shaped gold nanoparticles contacting the surface of the polyelectrolyte membrane, wherein the film has a thickness of from 1.2 nm to 2.2 nm and a crystalline structure.

2. The proton exchange membrane fuel cell according to claim 1, wherein the polyelectrolyte membrane comprises a sulfonated tetrafluoroethylene based fluoropolymer-copolymer.

3. The proton exchange membrane fuel cell according to claim 1 further comprising a gaseous composition containing hydrogen molecules ($H_2$) and carbon dioxide ($CO_2$) in contact with the anode.

4. The proton exchange membrane fuel cell according to claim 3, wherein the nanoparticles increase the efficiency of the fuel cell by at least 50%.

5. A method for making a proton exchange membrane fuel cell comprising:
   forming an polyelectrolyte membrane having a surface;
   preparing a solution of oblate-shaped gold nanoparticles;
   spreading the solution of nanoparticles onto a surface of water;
   compressing the solution of nanoparticles to form a film;
   coating the surface of the polyelectrolyte membrane with the film, wherein the film has a thickness of from 1.2 nm to 2.2 nm and a crystalline structure; and
   disposing the polyelectrolyte membrane with the film coating between a negative and positive electrode.

6. The method for making a proton exchange membrane fuel cell according to claim 5, wherein the polyelectrolyte membrane comprises a sulfonated tetrafluoroethylene based fluoropolymer-copolymer.

7. The method for making a proton exchange membrane fuel cell according to claim 5, wherein the solution of gold nanoparticles comprises a solvent.

8. The method for making a proton exchange membrane fuel cell according to claim 5, the solution of nanoparticles is compressed at a pressure of from 0.5 to 3.0 mN/m.

9. The method for making a proton exchange membrane fuel cell according to claim 5, the solution of nanoparticles is compressed at a pressure of from 1.0 to 2.0 mN/m.

* * * * *